US008831403B2

(12) United States Patent
Patil et al.

(10) Patent No.: US 8,831,403 B2
(45) Date of Patent: Sep. 9, 2014

(54) SYSTEM AND METHOD FOR CREATING CUSTOMIZED ON-DEMAND VIDEO REPORTS IN A NETWORK ENVIRONMENT

(75) Inventors: Deepti Patil, San Jose, CA (US); Satish K. Gannu, San Jose, CA (US); Sachin Kajarèkar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 13/364,102

(22) Filed: Feb. 1, 2012

(65) Prior Publication Data

US 2013/0195422 A1 Aug. 1, 2013

(51) Int. Cl.
*H04N 5/94* (2006.01)
(52) U.S. Cl.
USPC .......................................... 386/241; 386/239
(58) Field of Classification Search
None
See application file for complete search history.

(56) References Cited

U.S. PATENT DOCUMENTS

| | | | |
|---|---|---|---|
| 5,613,032 | A | 3/1997 | Cruz et al. |
| 5,677,901 | A | 10/1997 | Iwamura |
| 5,857,179 | A | 1/1999 | Vaithyanahan et al. |
| 5,961,582 | A | 10/1999 | Gaines |
| 6,012,053 | A | 1/2000 | Pant et al. |
| 6,026,388 | A | 2/2000 | Liddy et al. |
| 6,301,586 | B1 | 10/2001 | Yang et al. |
| 6,304,283 | B1 | 10/2001 | Kitagawa |
| 6,345,253 | B1 | 2/2002 | Viswanathan |
| 6,697,793 | B2 | 2/2004 | McGreevy |
| 6,980,660 | B1 | 12/2005 | Hind et al. |
| 7,017,183 | B1 | 3/2006 | Frey et al. |
| 7,072,837 | B2 | 7/2006 | Kemble et al. |
| 7,099,867 | B2 | 8/2006 | Okada et al. |
| 7,260,312 | B2 | 8/2007 | Srinivasan et al. |
| 7,292,532 | B2 | 11/2007 | Sakata et al. |

(Continued)

FOREIGN PATENT DOCUMENTS

| | | |
|---|---|---|
| CN | 102648464 A | 8/2012 |
| EP | 2483803 | 4/2011 |

(Continued)

OTHER PUBLICATIONS

Grimes, Seth, "Sentiment Analysis: Opportunities and Challenges," Beye Network; Jan. 22, 2008; 6 pages, http://www.b-eye-network.com/view/6744.

(Continued)

*Primary Examiner* — William C Vaughn, Jr.
*Assistant Examiner* — Eileen Adams
(74) *Attorney, Agent, or Firm* — Patent Capital Group

(57) ABSTRACT

An example method includes receiving a search query that includes one or more attributes; evaluating a plurality of video files; identifying video clips within the video files that have one or more of the search attributes; and creating a video report comprising a contiguous sequence of the video clips, where the video clips are stitched together according to a stitch criterion. In more particular embodiments, the method can include providing a user interface configured for receiving feedback associated with the plurality of video files. Additionally, the method may include tagging the video files with tags corresponding to predefined attributes; and identifying the predefined attributes in response to the search query. Furthermore, method can include matching the tags with the one or more search attributes, where at least one video clip in a particular one of the video files has at least some of the one or more search attributes.

20 Claims, 5 Drawing Sheets

(56) References Cited

U.S. PATENT DOCUMENTS

| | | |
|---|---|---|
| 7,350,227 B2 | 3/2008 | McGrew et al. |
| 7,417,959 B2 | 8/2008 | Dorner et al. |
| 7,457,808 B2 | 11/2008 | Gaussier et al. |
| 7,493,369 B2 | 2/2009 | Horvitz et al. |
| 7,509,491 B1 | 3/2009 | Wainner et al. |
| 7,603,350 B1 | 10/2009 | Guha |
| 7,617,451 B2 | 11/2009 | Jones et al. |
| 7,698,442 B1 | 4/2010 | Krishnamurthy et al. |
| 7,706,265 B2 | 4/2010 | Monette et al. |
| 7,809,714 B1 | 10/2010 | Smith |
| 7,818,215 B2 | 10/2010 | King et al. |
| 7,827,191 B2 | 11/2010 | Williams |
| 7,853,553 B2 | 12/2010 | Lankinen et al. |
| 7,913,176 B1 | 3/2011 | Blattner et al. |
| 8,015,250 B2 | 9/2011 | Kay |
| 8,051,204 B2 | 11/2011 | Kai et al. |
| 8,214,209 B2 | 7/2012 | Nagatomo |
| 8,255,386 B1 | 8/2012 | Annau et al. |
| 8,260,774 B1 | 9/2012 | Aggarwal |
| 8,374,983 B1 | 2/2013 | Pohl et al. |
| 2002/0032772 A1 | 3/2002 | Olstad et al. |
| 2002/0035605 A1 | 3/2002 | McDowell et al. |
| 2002/0087311 A1 | 7/2002 | Leung Lee et al. |
| 2002/0091741 A1 | 7/2002 | Ferreira et al. |
| 2002/0093915 A1 | 7/2002 | Larson |
| 2003/0014399 A1 | 1/2003 | Hansen et al. |
| 2003/0014448 A1 | 1/2003 | Castellanos et al. |
| 2003/0014586 A1* | 1/2003 | Mitsuda et al. ............... 711/112 |
| 2003/0028773 A1 | 2/2003 | McGarvey et al. |
| 2003/0028896 A1 | 2/2003 | Swart et al. |
| 2003/0033288 A1 | 2/2003 | Shanahan et al. |
| 2003/0074555 A1 | 4/2003 | Fahn et al. |
| 2003/0093789 A1 | 5/2003 | Zimmerman et al. |
| 2004/0049714 A1 | 3/2004 | Marples et al. |
| 2004/0158609 A1 | 8/2004 | Daniell et al. |
| 2004/0193426 A1 | 9/2004 | Maddux et al. |
| 2004/0208123 A1 | 10/2004 | Sakata et al. |
| 2004/0258396 A1 | 12/2004 | Nakamura et al. |
| 2005/0004922 A1 | 1/2005 | Zernik |
| 2005/0060283 A1 | 3/2005 | Petras et al. |
| 2005/0063352 A1 | 3/2005 | Amara et al. |
| 2005/0068167 A1 | 3/2005 | Boyer et al. |
| 2005/0076198 A1 | 4/2005 | Skomra et al. |
| 2005/0086197 A1 | 4/2005 | Boubez et al. |
| 2005/0102522 A1 | 5/2005 | Kanda |
| 2005/0108001 A1 | 5/2005 | Aarskog |
| 2005/0160166 A1 | 7/2005 | Kraenzel |
| 2005/0272405 A1 | 12/2005 | Tomlinson et al. |
| 2006/0048210 A1 | 3/2006 | Hildre et al. |
| 2006/0149781 A1* | 7/2006 | Blankinship ............... 707/103 R |
| 2006/0150253 A1 | 7/2006 | Feuerstein et al. |
| 2006/0168213 A1 | 7/2006 | Richardson et al. |
| 2006/0206483 A1 | 9/2006 | Knepper et al. |
| 2006/0224587 A1 | 10/2006 | Zamir et al. |
| 2006/0285493 A1 | 12/2006 | Manuja et al. |
| 2007/0016583 A1 | 1/2007 | Lempel et al. |
| 2007/0038437 A1 | 2/2007 | Brun |
| 2007/0106908 A1 | 5/2007 | Miyazaki et al. |
| 2007/0118275 A1 | 5/2007 | Qi et al. |
| 2007/0198725 A1 | 8/2007 | Morris |
| 2007/0206617 A1 | 9/2007 | Andreasen et al. |
| 2007/0239680 A1 | 10/2007 | Oztekin et al. |
| 2007/0239837 A1 | 10/2007 | Jablokov et al. |
| 2007/0244892 A1 | 10/2007 | Narancic |
| 2007/0253682 A1 | 11/2007 | Chang et al. |
| 2007/0260684 A1 | 11/2007 | Sharma et al. |
| 2007/0266020 A1 | 11/2007 | Case et al. |
| 2007/0294265 A1 | 12/2007 | Askew et al. |
| 2008/0027981 A1 | 1/2008 | Wahl |
| 2008/0060055 A1 | 3/2008 | Lau |
| 2008/0065892 A1 | 3/2008 | Bailey et al. |
| 2008/0077791 A1 | 3/2008 | Lund et al. |
| 2008/0091670 A1 | 4/2008 | Ismalon |
| 2008/0097985 A1 | 4/2008 | Olstad et al. |
| 2008/0104128 A1 | 5/2008 | Drayer et al. |
| 2008/0126690 A1 | 5/2008 | Rajan et al. |
| 2008/0140674 A1 | 6/2008 | Ishikawa |
| 2008/0154873 A1 | 6/2008 | Redlich et al. |
| 2008/0184326 A1 | 7/2008 | Nakajima |
| 2008/0222142 A1 | 9/2008 | O'Donnell |
| 2008/0244740 A1 | 10/2008 | Hicks et al. |
| 2008/0294903 A1 | 11/2008 | Miyazaki et al. |
| 2008/0295040 A1 | 11/2008 | Crinon |
| 2008/0313144 A1 | 12/2008 | Huston |
| 2009/0006333 A1 | 1/2009 | Jones et al. |
| 2009/0049053 A1 | 2/2009 | Barker et al. |
| 2009/0055175 A1 | 2/2009 | Terrell et al. |
| 2009/0119278 A1 | 5/2009 | Cross et al. |
| 2009/0182727 A1 | 7/2009 | Majko |
| 2009/0196570 A1 | 8/2009 | Dudas et al. |
| 2009/0210715 A1 | 8/2009 | Izu et al. |
| 2009/0226870 A1 | 9/2009 | Minotti |
| 2009/0234497 A1 | 9/2009 | Uejo |
| 2009/0234834 A1 | 9/2009 | Cozzi |
| 2009/0254572 A1 | 10/2009 | Redlich et al. |
| 2009/0276377 A1 | 11/2009 | Dutta et al. |
| 2009/0293016 A1 | 11/2009 | Potevin et al. |
| 2009/0319365 A1* | 12/2009 | Waggoner et al. ......... 705/14.41 |
| 2009/0327271 A1 | 12/2009 | Amitay et al. |
| 2010/0005306 A1 | 1/2010 | Izu et al. |
| 2010/0010968 A1 | 1/2010 | Redlich et al. |
| 2010/0057815 A1 | 3/2010 | Spivack et al. |
| 2010/0088331 A1 | 4/2010 | White et al. |
| 2010/0153855 A1 | 6/2010 | Roberts et al. |
| 2010/0179801 A1 | 7/2010 | Huynh et al. |
| 2010/0217975 A1 | 8/2010 | Grajek et al. |
| 2010/0223581 A1 | 9/2010 | Manolescu et al. |
| 2010/0223629 A1 | 9/2010 | Appelbaum et al. |
| 2010/0250547 A1 | 9/2010 | Grefenstette et al. |
| 2010/0274815 A1 | 10/2010 | Vanasco |
| 2010/0280985 A1 | 11/2010 | Duchon et al. |
| 2010/0306816 A1 | 12/2010 | McGrew et al. |
| 2011/0077936 A1 | 3/2011 | Arumugam et al. |
| 2011/0078167 A1 | 3/2011 | Sundaresan et al. |
| 2011/0078550 A1 | 3/2011 | Nabutovsky |
| 2011/0099195 A1* | 4/2011 | Patwardhan et al. ......... 707/769 |
| 2011/0119264 A1 | 5/2011 | Hu et al. |
| 2011/0161409 A1* | 6/2011 | Nair et al. ................... 709/203 |
| 2011/0173260 A1 | 7/2011 | Biehl et al. |
| 2011/0196802 A1 | 8/2011 | Ellis et al. |
| 2011/0208522 A1 | 8/2011 | Pereg et al. |
| 2011/0225048 A1 | 9/2011 | Nair |
| 2011/0231296 A1 | 9/2011 | Gross et al. |
| 2011/0252330 A1 | 10/2011 | Catlin et al. |
| 2011/0258308 A1 | 10/2011 | Arumugam et al. |
| 2011/0270709 A1 | 11/2011 | Lewis et al. |
| 2011/0270843 A1 | 11/2011 | Albin |
| 2011/0304685 A1* | 12/2011 | Khedouri et al. ......... 348/14.02 |
| 2012/0002544 A1 | 1/2012 | Kokku et al. |
| 2012/0030232 A1 | 2/2012 | John et al. |
| 2012/0046936 A1 | 2/2012 | Kandekar et al. |
| 2012/0078952 A1 | 3/2012 | Araya |
| 2012/0081506 A1 | 4/2012 | Marvit |
| 2012/0102050 A1 | 4/2012 | Button et al. |
| 2012/0110087 A1 | 5/2012 | Culver et al. |
| 2012/0185239 A1 | 7/2012 | Goud et al. |
| 2012/0271805 A1 | 10/2012 | Holenstein et al. |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS

Hess, Andreas, et al., "From Web 2.0 to Semantic Web: A Semi-Automated Approach," 15 pages; printed Sep. 30, 2009; http://www.andreas-hess.info/publications/hess-cisweb08.pdf.

iLogos v1.5 download (win); 4 pages. [Retrieved and printed on May 28, 2010] from http://www.phil.cmu.edu/projects/argument_mapping/.

(56) References Cited

OTHER PUBLICATIONS

PCT Jan. 12, 2011 Notification of Transmittal (1 page) of the International Search Report (3 pages), and Written Opinion of the International Searching Authority, or the Declaration (6 pages) mailed Jan. 12, 2011 for PCT/US2010/050762.
Sethy, Abhinav, et al., "Building Topic Specific Language Models from Webdata Using Competitive Models," 9th European Conference on Speech Communication and Technology, Eurospeech Interspeech 2005 International Speech and Communication Association Fr., 2005, pp. 1293-1296; XP 002614341; http://sail.usc.edu/publications/sethy-euro2005.pdf.
Virage, "Understanding Video," Autonomy Virage, © 2009 Autonomy Virage, 5 pages http://www.virage.com/rich-media/technology/understanding-video/index.htm.
Wang, Xuerui, et al., "Topics over Time: A NonMarkov Continuous Time Model of Topical Trends," KDD'06, Aug. 20-23, 2006, 10 pages.
Wasilewska, Anita, CSE 634—Data Mining: Text Mining; 85 pages; www.cs.sunysb.edu/~cse634/presentations/TextMining.pdf.
WebChoir Products—Personal Vocabulary Tools, "Personal Tools," 1 page; printed Sep. 30, 2009 http://www.webchoir.com/products/ptt.html.
PCT Apr. 3, 2012 International Preliminary Report on Patentability and Wrtten Opinion of the International Searching Authority from International Application PCT/US2010/050762; 7 pages.
EPO Nov. 7, 2012 Response to Communication pursuant to Rule 161(1) and 162 from European Application No. 10770664; 8 pages.
PCT Oct. 4, 2012 Notification of Transmittal of the International Search Report and Written Opinion of the International Search Authority from Application PCT/US2012/040097; 15 pages.
Bollen, et al., "Usage Derived Recommendations for a Video Digital Library," Journal of Network and Computer Applications, Academic Press, New York, NY, vol. 30, No. 3, Mar. 16, 2007.
Umbrich J., et al., "Four Heuristics to Guide Structured Content Crawling," Eighth International Conference on WEB Engineering, 2008, Jul. 14, 2008; © 2008 IEEE DOI 10.1109/ICWE.2008.42.
Seher, Indra, "Query Expansion in Personal Queries," IADIAS (International Association for Development of the Information Society) 2006, 5 pages www.iadis.org/Multi2006/papers/16/5023_ISA.
Jiang, Weiliang, et al., "A Method for Personal Query Based on Role Preference Ontology," Industrial Mechanatronics and Automation, ICIMA 2009 International Conference, pp. 479-481; Abstract Only, 1 page.
U.S. Appl. No. 13/608,787, filed Sep. 10, 2012 entitled "System and Method for Enhancing Metadata in a Video Processing Environment," Inventor(s) Sandipkumar V. Shah, et al.
"The LNTS Leap: Phoneme Recognition," 2 pages; printed Sep. 30, 2009; http://www.Intstech.com.
Billi, R., et al., "Interactive Voice Technology at Work: The CSELT Experience," $2^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.
Carnegie Mellon University, "Speech at CMU," 4 pages; printed Sep. 30, 2009; http://www.speech.cs.cmu.edu/speech/.
Caslon Analytics Echelon Note: Overview, May 2006, 6 pages; printed Sep. 30, 2009 http://www.caslon.com.au/echelonnote.htm.
Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340; ISSN: 0002-8231; pp. 17-31.
Chen, Rung-Ching, et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.
U.S. Appl. No. 12/571,404, filed Sep. 30, 2009, entitled "System and Method for Generating Personal Vocabulary from Network Data," Inventors: Satish K. Gannu, et al.
U.S. Appl. No. 12/571,414, filed Sep. 30, 2009, entitled "System and Method for Providing Speech Recognition Using Personal Vocabulary in a Network Environment," Inventors: Satish K. Gannu, et al.
U.S. Appl. No. 12/571,421, filed Sep. 30, 2009, entitled "System and Method for Ensuring Privacy While Tagging Information in a Network Environment," Inventors: Satish K. Gannu, et al.
U.S. Appl. No. 12/571,426, filed Sep. 30, 2009, entitled "System and Method for Controlling an Exchange of Information in a Network Environment," Inventors: Satish K. Gannu, et al.
U.S. Appl. No. 12/762,194, filed Apr. 16, 2010, entitled "System and Method for Deducing Presence Status from Network Data," Inventors: Thangavelu Arumugam, et al.
U.S. Appl. No. 12/778,899, filed May 12, 2010, entitled "System and Method for Deriving User Expertise Based on Data Propagating in a Network Environment," Inventors: Virgil N. Mihailovici, et al.
U.S. Appl. No. 12/971,852, filed Dec. 17, 2010, entitled "System and Method for Providing Argument Maps Based on Activity in a Network Environment," Inventors: Deepti Patil et al.
U.S. Appl. No. 12/971,946, filed Dec. 17, 2010, entitled "System and Method for Providing Feeds Based on Activity in a Network Environment," Inventors: Satish K. Gannu et al.
U.S. Appl. No. 13/088,974, filed Apr. 18, 2011, entitled "System and Method for Providing Augmented Data in a Network Environment," Inventors: Satish K. Gannu et al.
U.S. Appl. No. 13/098,112, filed Apr. 29, 2011, entitled "System and Method for Evaluating Visual Worthiness of Video Data in a Network Environment," Inventors: Deepti Patil et al.
U.S. Appl. No. 13/098,434, filed Apr. 30, 2011, entitled "System and Method for Media Intelligent Recording in a Network Environment," Inventors: Ashutosh A. Malegaonkar et al.
U.S. Appl. No. 13/149,405, filed May 31, 2011, entitled "System and Method for Evaluating Results of a Search Query in a Network Environment," Inventors: Satish K. Gannu et al.
U.S. Appl. No. 13/160,701, filed Jun. 15, 2011, entitled "System and Method for Discovering Videos," Inventors Ashutosh A. Malegaonkar et al.
U.S. Appl. No. 13/182,862, filed Jul. 14, 2011, entitled "System and Method for Deriving User Expertise Based on Data Propagating in a Network Environment," Inventors: Satish K. Gannu, et al.
Hess, Andreas, et al., "Multi-Value Classification of Very Short Texts," 8 pages, printed on May 12, 2010; http://www.andreas-hess.info/publications/hess-ki08.pdf.
Horvitz, E., et al., "Coordinate: Probabilistic Forecasting of Presence and Availability," 2002, 10 pages, ftp://ftp.research.microsoft.com/pub/ejh/coordinate.pdf.
Kohl, J. and C. Neuman, The Kerberos Network Authentication Service (V5), Network Working Group, RFC 1510, Sep. 1993, 105 pages, http://www.ietf.org/rfc/rfc1510.
Lancope, "Stealth Watch," Revolutionize the Way You View Your Network, © 2009, 8 pages http://storage.pardot.com/2382/9637/StealthWatch_System_Family_Brochure.pdf.
Montgomery, W. A., et al., "Network Intelligence for Presence Enhanced Communication," SPIRITS Working Group, May 2002, 9 pages, http://ietfreport.isoc.org/all-ids/draft-montgomery-copeland-presence-spirits-00.txt.
Nortel Networks Wireless Solutions (A. Silver, J. Larkins, D. Stringer), "Unified Network Presence Management," A White Paper, © 2000, 6 pages, www.mobilein.com/UNPM.pdf.
Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.
Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.
Rodriguez, et al. Automatic Metadata Generation Using Associative Networks, ACM Transactions on Information Systems, vol. 27, No. 2, Article 7, Feb. 2009.
Telestream, Inc. Product Literature, "Extracting and Preparing Metadata to Make Video Files Searchable," Telestream, Inc. 2008; 6 pages.

(56) References Cited

OTHER PUBLICATIONS

"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.

"Recommender System," Wikipedia, Apr. 28, 2012; 9 pages http://en.wikipedia.org/wiki/Recommender_system.

"Understanding Metadata," NISO Press, National Information Standards Organization, 2004, 20 pages.

"Wang, Feng, et al., ""Multi-Document Video Summarization"" ICME 2009, IEEE International Conference on Multimedia and Expo, 4 pages http://www.eurecom.fr/fr/publication/2751/download/mm-publi-2751.pdf".

Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.

Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.

Gligorov, User-generated Metadata in Audio-visual Collections, Proceedings of the International World Wide Web Conference, WWW 2012, Apr. 16-20, 2012, Lyon, France (2012); 5 pages.

Jadhav, N.S. and I.N. Dwivedi, "Social computing based personal vocabulary building," 5 pages; printed Sep. 30, 2009; http://www.priorartdatabase.com/IPCOM/000173550/.

Lacher, Martin S., et al., "On the Integration of Topic Maps and RDF Data," Extreme Markup Languages 2001, 14 pages.

Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.

Masnick, Mike, "Creating an Automatic Highlight Reel for Sporting Events (Bleeding Edge)," TechDirt lite, Aug. 20, 2003, 2 pages http://www.techdirt.com/article_lite.php?sid=20030820/0042248&pid=17.

Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.

Moorthi, Y. L. R., "Have Breakfast or Be Breakfast," Wall Street Journal, Feb. 8, 2010, 2 pages; http://online.wsj.com/article/SB126465641868236415.html#printMode.

Nexidia, "Audio and Speech Analytics Software," 1 page; printed Sep. 30, 2009; http://www.nexidia.com.

NSA Watch, "Other Surveillance Network: Governmental Surveillance Agencies," 2 pages; printed Sep. 30, 2009; http://www.nsawatch.org/networks.html.

Ohl, Ricky, "Computer Supported Argument Visualisation: Modelling Wicked Problems," Ph.D. Thesis, Australian Digital Theses Program, Feb. 2008; 403 pgs.; http://gu.edu.au:8080/adt-root/public/adt-QGU20090724.155249/index.html.

Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.

Rosella Data Mining & Database Analytics, "Web Search and Web Navigation Pattern Analyzer," 3 pages; printed Jul. 25, 2011; http://222.roselladb.com/surf-pattern-analyzer.htm.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Smith, Ronnie W., "Performance Measures for the Next Generation of Spoken Natural Language Dialog Systems," pp. 37-40; http://acl.ldc.upenn.edu/W/W97/W97-0607.pdf.

Swabey, Pete, "Making the Invisible Visible," 2 pages; Sep. 23, 2009; http://www.trampolinesystems.com/news/in+the+news/archive/2009/59.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.

Trampoline Systems, "Navigation," 2 pages; printed Sep. 30, 2009; www.trampolinesystems.com.

Trant, Jennifer, "Studying Social Tagging and Folksonomy: A Review and Framework ," Jan. 2009, 10(1) Journal of Digital Information; 42 pages http://dlist.sir.arizona.edu/arizona/handle/10150/105375.

Virage, "Audio Analysis," Autonomy Virage, © 2009 Autonomy Virage, 1 page http://www.virage.com/security-and-surveillance/functions/audio-analysis/index.htm.

Wikipedia, "Homophone," 3 pages; printed Sep. 30, 2009; http://en.wikipedia.org/wiki/Homophone.

Wikipedia, "International Phonetic Alphabet," 19 pages; printed Sep. 30, 2009; http://en.wikipedia.org/wiki/International_Phonetic_Alphabet.

Wikipedia, "Phoneme," 7 pages; printed Sep. 30, 2009; http://en.wikipedia.org/wiki/Phoneme.

PCT Dec. 17, 2013 International Preliminary Report on Patentability from International Application Serial No. PCT/US2012/040097; 10 pages.

* cited by examiner

SYSTEM AND METHOD FOR CREATING CUSTOMIZED ON-DEMAND VIDEO REPORTS IN A NETWORK ENVIRONMENT

TECHNICAL FIELD

This disclosure relates in general to the field of communications and, more particularly, to a system and a method for creating customized on-demand video reports in a network environment.

BACKGROUND

The field of communications has become increasingly important in today's society. In particular, the ability to effectively gather, associate, and organize information presents a significant obstacle for component manufacturers, system designers, and network operators. As new communication platforms and technologies become available, new protocols should be developed in order to optimize the use of these emerging protocols. With the emergence of high bandwidth networks and devices, enterprises can optimize global collaboration through creation of videos, and personalize connections between customers, partners, employees, and students through user-generated video content. Widespread use of video in turn drives advances in technology for video creation, uploading, searching, and viewing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
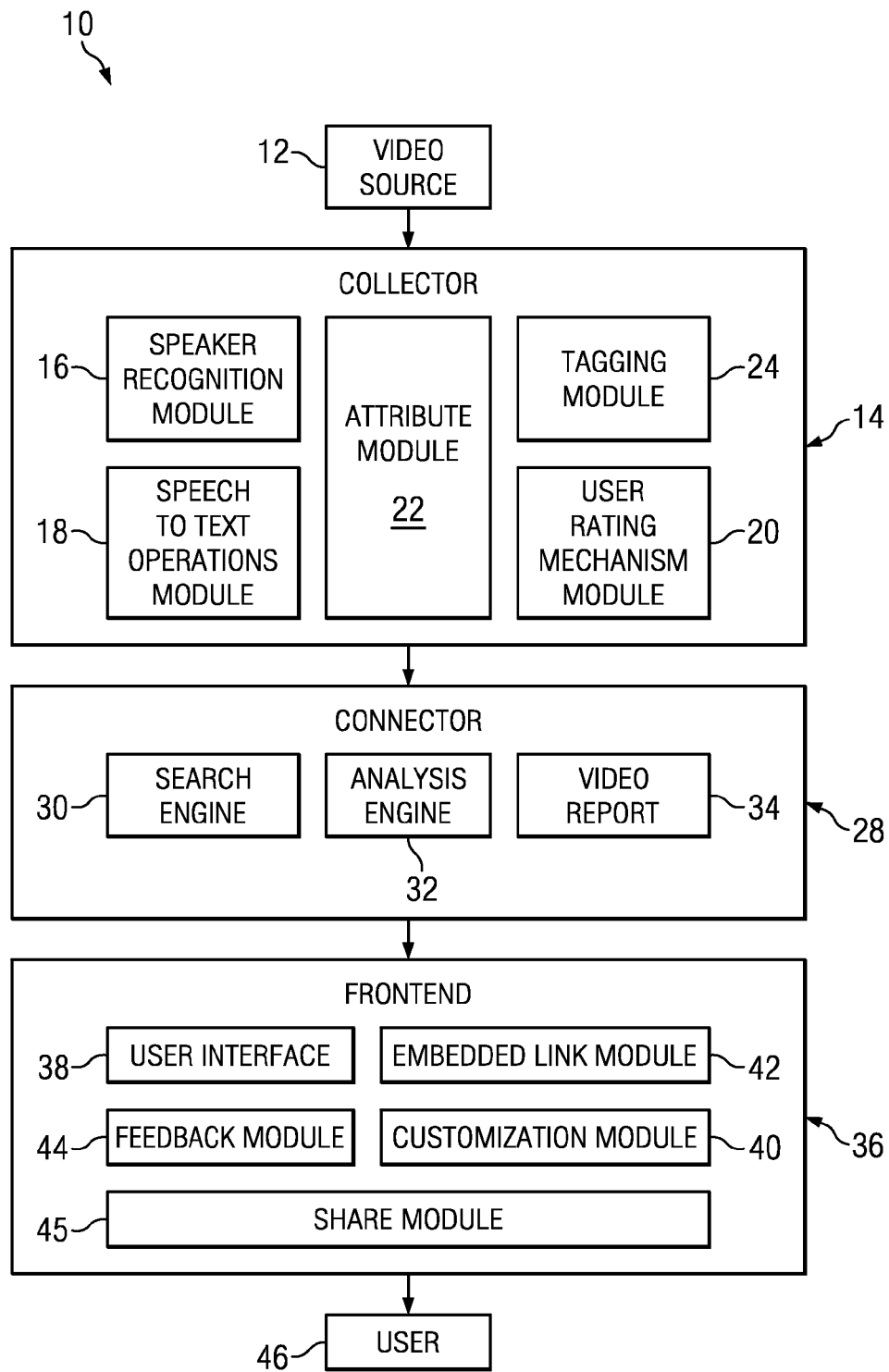
FIG. 1 is a simplified diagram of one embodiment of a communication system in accordance with the present disclosure.

An example method includes receiving a search query that includes one or more attributes; evaluating a plurality of video files; identifying video clips within the video files that have one or more of the search attributes; and creating a video report comprising a contiguous sequence of the video clips, where the video clips are stitched together according to a stitch criterion.

In more particular embodiments, the method can include providing a user interface configured for receiving feedback associated with the plurality of video files. Additionally, the method may include tagging the video files with tags corresponding to predefined attributes; and identifying the predefined attributes in response to the search query. Furthermore, method can include matching the tags with the one or more search attributes, where at least one video clip in a particular one of the video files has at least some of the one or more search attributes.

The factual search query can be a natural language query, a customization form that includes predefined attributes, etc. The predefined attributes can include virtually any characteristic or parameter, such as an author attribute reflective of authorship of a particular video file; an identity attribute reflective of an identity of a speaker in a video content of the particular video file; a video playing source attribute; a number of views attribute associated with a number of times the particular video file has been viewed; a text attribute associated with spoken words recorded in the particular video file; a rating attribute associated with user ratings of the particular video file; an upload time attribute associated with when the particular video file was uploaded; a commentary attribute associated with comments in the particular video file; a location attribute associated with a location for the particular video file; an event attribute associated with an event recorded in the particular video file; and a scene change attribute associated with differences between video frames.

The stitch criterion can include any number of characteristics, such as an upload time attribute associated with when a particular video file was uploaded; a video creation time attribute associated with when the particular video file was created; an event time attribute associated with a time of an event recorded in the particular video file; a rating attribute associated with user ratings of the particular video file; and a number of views attribute associated with a number of times the particular video file has been viewed.

In certain implementations, the video report comprises embedded links corresponding to particular video clips, and where each of the embedded links can be selected to access a corresponding video file that includes the particular video clips. In addition, the method may include providing the video report to a next destination. The providing can include sending the video report via electronic mail; publishing the video report; and uploading the video report to a video sharing website. In addition, the method may include providing a user interface configured for editing the video report.

EXAMPLE EMBODIMENTS

Turning to FIG. 1, FIG. 1 is a simplified block diagram of communication system 10 for creating customized on-demand video reports in a network environment in accordance with one embodiment of the present disclosure. FIG. 1 illustrates a video source 12, which may include multiple video files. Video source 12 may interface with a collector 14, which includes a speaker recognition module 16, a speech-to-text operations module 18, a user rating mechanism module 20, an attribute module 22, and a tagging module 24. Collector 14 may interface with a connector 28, which includes a search engine 30, an analysis engine 32, and a video report 34. The architecture of FIG. 1 may include a frontend 36 provisioned with a user interface 38, a customization module 40, an embedded link module 42, a feedback module 44, and a share module 45. A user 46 can access frontend 36 to find video clips (e.g., sections within the video file) having one or more attributes, as discussed herein.

As used herein, the term "attribute" refers to any property of a video file, or an object or element (e.g., a signature) in the video file; a specific value for a given instance of such property; or metadata (or value thereof) associated with the video file. Examples of attributes include: an author attribute reflective of authorship of the video file; an identity attribute reflective of an identity of a speaker in a video content of the video file; a video playing source attribute; a number of views attribute associated with a number of times the video has been viewed; a text attribute associated with spoken words recorded in the video file; a rating attribute associated with user ratings of the video; an upload time attribute associated with when the video file was uploaded; a commentary attribute associated with comments in the video; a location attribute associated with a location for the video file; an event attribute associated with an event recorded in the video file; a scene change attribute associated with differences between video frames; a video creation time attribute associated with when the video file was created; etc.

Various attributes are possible for any video file propagating within communication system 10. Each attribute may be associated with a corresponding video clip in the video file; conversely, each video clip in the video file may be associated with one or more attributes. A video file can be logically divided into a plurality of video clips. The logical divisions may overlap, or be mutually exclusive. Moreover, the logical divisions may not be fixed, but rather can be dynamically changed based on various factors, including search queries for the video clips. In some embodiments, the length of the video clips may be customized (e.g., user 46 can select the length of each video clip); in other embodiments, the length of the video clip may be predetermined (e.g., administrator may set a pre-determined length of 8 seconds for each video clip; or a size limit, such as 2 MB, for the video clip may be set; etc.). In yet other embodiments, the length of the video clip may be any value, assigned suitably (and in some scenarios, dynamically) based on particular needs. To associate an attribute with a video clip, the video file may be divided into the plurality of video clips such that one of the video clips has the attribute.

For example, a video file that has a length of 1 minute 30 seconds may include video content that shows: (i) speaker John speaking about Widget Business Unit in the first 30 seconds of the video file, and (ii) audience laughing in the last 30 seconds of the video file. User 46 may set a customized length of 30 seconds for each video clip. Collector 14 may analyze the video file and determine that the following attributes may be associated with the video file: <identity>: John; <text> Widget Business Unit; and <event> laughter. The video file may be divided into a plurality of video clips such that a first video clip includes the first 30 seconds of the video file, and has the following attributes: <identity>: John; and <text> Widget Business Unit; and a second video clip includes the last 30 seconds of the video file, and has the following attributes: <event> laughter. If another user sets a video clip length of 2 minutes, the video file of the previous example may include a single video clip with all three attributes.

In some scenarios, the entire video file may have a common attribute. For example, the upload time of the video file may be common to any video clip into which the video file may be divided. In other scenarios, one video file can have multiple instances of the same attribute. For example, John may speak multiple times at various times in the video file. Depending on the length of the video clips into which the video file may be divided, each video clip may have none, one, or multiple instances of the same attribute. Various possibilities of dividing the video file into video clips are possible within the broad scope of the present disclosure.

Embodiments of communication system 10 may provide a user (e.g., user 46) with features that support on-demand video report generation based on multiple videos within a video repository (e.g., video source 12), using not only spoken words within the video content, but also who spoke those words (speaker identification), how popular a certain section was (per segment rating incorporation) and scenario detection (everyone laughing, music being played in the background, shot outdoors etc.) Features of communication system 10 may: allow for automatic multiple video editing using various attributes like spoken and tagged keywords, speakers, upload date, action detection, segment based ratings etc.; make video consumption easy, quick, relevant and personalized to each user's defined preferences; and allow users to easily share their finds/video research with others by sending a consolidated video report that takes into account the user's customizations and preferences.

Note that for purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

In document database searching, users seeking to research a particular topic may search for various documents on the topic, bookmark or highlight snippets (e.g., relevant portions of the document), copy and paste the lines/paragraphs into a new document, and compile all of it into a single document for future reference or public sharing. In contrast, although various solutions for capturing various aspects of generating, consuming, and sharing video files exist in the marketplace, existing search and share technologies for videos cannot be compared to document database searching. For example, trying to scan in numerous video files in a system, search for short snippets, or a particular word/speaker/author etc., and subsequently share the consolidated results across an enterprise may be quite difficult, if not impossible.

In one example of existing technology, Optimized Balanced Audio Video Maximal marginal Relevance (OB-MMR) is utilized to analyze video content and to condense the content into an abbreviated descriptive video summary. Video summaries exploit audiovisual information to obtain an underlying relation among video frames and create a condensed version from the original video. Video summaries are generally useful for a long video, and the user can watch the video summary without having to view the details. In creating video summaries, selected frames are typically inserted into an index based on key-frames, text, video segments, and graphic cues. However, such technologies do not allow users to demand a video report to be automatically generated (e.g., using a plurality of videos in a video repository) based on attributes (e.g., speakers within a video; topics spoken; date uploaded; actions occurred (laughing, music, etc.)).

In another example of existing technology, multi-video summarization may be implemented based on textual and visual components. Multi-video summarization can be used to create a video summary for a set of topic-related videos having several sub-themes or sub-events around a main topic. For example, a news aggregator may gather various sets of topic related news videos (e.g., sports news, political news, weather news, etc.) and provide respective summaries to represent each set such that the user can easily understand the topics after viewing the summaries and then decide whether to watch a particular set (e.g., sports news). However, such technologies do not have user customization, and on-demand video report generation, speaker recognition and tagging, per-segment based user ratings, speaker identification, scenario detection, etc.

A system for creating customized on-demand video reports in a network environment, illustrated in FIG. 1, can resolve many of the aforementioned issues. Embodiments of communication system 10 can search a plurality of video files in a network environment, identify video clips having one or more "search attributes" (e.g., attributes contained in a search query, for example, populated by user 46), and generate video report 34 comprising a contiguous sequence of the identified video clips, with the video clips being stitched together according to a stitch criterion. As used herein the term "stitch criterion" refers to any attribute or other parameter that may be used to arrange the video clips in video report 34. Stitch criteria may include, as examples, an upload time attribute associated with when the video file was uploaded; a video creation time attribute associated with when the video file was created; a rating attribute associated with user ratings of the video file; a number of views attribute associated with a number of times the video file has been viewed; etc. If the upload time attribute is selected as the stitch criterion, the video clips may be arranged in video report 34 according to the upload time of the respective video files, for example, with a video clip from the earliest uploaded video file placed first, followed by video clips from subsequently uploaded video files.

The architecture of communication system 10 can (automatically) generate a customized on-demand video report 34 using video source 12, such that video report 34 includes video clips selected by user 46 (e.g., based on topics of interest to user 46; involving feedback from various other users; etc.), gathered and stitched (e.g., joined) together as a contiguous sequence of the video clips without any manual intervention. Communication system 10 can build a new, or augment an existing, video tagging and search system that can allow user 46 to command communication system 10 to search, copy, paste, edit, etc. video clips from one or more video files in video source 12 and stitch them together to create, automatically (and on-demand), video report 34 in a form of a contiguous sequence of the video clips, which may be easier to consume and share (than, for example, multiple individual video clips or files that have to be separately selected and viewed).

In accordance with certain embodiments, communication system 10 can be configured to recognize video clips based on various attributes (e.g., speaker identification, content-type attributes, etc.) For example, user 46 can search for video clips using a natural language query on user interface 38, such as: "Search and prepare a video report consisting of snippets from videos dated January 2011 to July 2011 that have John speak about Widget Business Unit;" or "Prepare a video report from The Company events in the system database that showcase or speak about product ABC capabilities;" or "Prepare a composite video of all instances of an audience laughing with Jane as a speaker in it;" etc. In yet other embodiments, video report 34 may be automatically generated based on user's 46 choice (e.g., using customization module 40) of various attributes, such as topics, speakers, actions (e.g., laughing, yawning, etc.), keywords, events, dates, location, upload time, etc., for ease of consumption and sharing.

In addition, embodiments of communication system 10 can provide for searching video source 12 and then evaluating each video file in video source 12 for the search attributes selected by user 46. If the search attribute is recognized in the video file, the video file may be divided into a plurality of video clips such that at least one video clip has the search attributes. The video clips having the search attributes may be collected and arranged into a contiguous sequence to create video report 34. In various embodiments, enhancements such as adding text strings to each video clip, for example as a text summary; highlighting words in video clip; etc. may also be implemented. In some embodiments, user 46 may be able to move the video clips around in video report 34, for example, to improve the summary before publishing video report 34.

Communication system 10 is configured to allow user 46 to provide per snippet feedback using feedback module 44, for example, by selecting (e.g., clicking) a suitable item (e.g., "Like" button icon, or "Thumbs-up" button icon, etc.) for sections within video report 34. In various embodiments, embedded link module 42 can insert embedded links in video report 34 to link to the original video files in which the desired video clips were identified. For example, when user 46 clicks on a video clip of video report 34, user 46 may be able to access and view the corresponding original video file from which the video clip was pulled.

In operation, the architecture of communication system 10 may also be configured to identify various attributes of the video file, such as identity of the speakers in a video content of each video file; identification of the accompanying speech; text identification; video location; authorship; mechanism for users to rate; etc. The architecture may readily identify timestamps associated with when the speakers start and stop speaking. Speaker recognition module 16 may allow speaker identification using various methods, including speaker recognition, face recognition, speech identification, text identification, and/or a combination thereof. In the case of speech recognition, phrases such as "Let me introduce Ms. XYZ," "Let's welcome ABC," "We have among us DEF", etc. can be extracted to match these names to the identity of the speaker, or persons appearing in the video. Additionally, text identification can extract names from banners welcoming celebrities, or information can be gleaned from placards that identify panelists, from video credits, from sub-titles within a video, from closed-caption streams, etc.

Speech to text operations module 18 may convert speech to text using any suitable speech to text translation method. The text may be stored and associated with the corresponding video file, for example, to enable faster searching for keywords. In certain aspects of the present disclosure, user rating mechanism module 20 may permit users (e.g., user 46) to rate one or more video clips (e.g., as "must watch," "not worth watching", "like," or any other labeling that would be indicative of the value of watching a particular video clip). In other implementations, such indicators could be as simple as a "thumbs up/thumbs down" soft button (or a slider, or other interactive control), where the user is invited to make a selection depending on their level of engagement. Moreover, a collection of these ratings across various users (e.g., over a period of time) can be used by analysis engine 32 to compile video clips suitably for video report 34.

In particular embodiments, attribute module 22 may identify a video type (e.g., demonstration video, advertisement, etc.) by extracting keywords (e.g., "demonstration", "demo", "trial", "show you how", "let's see how this is done", "as you can see", "to/on my right/left", "above/below me", "at the bottom/top/bottom left/bottom right/top left/top right", "the following slides", etc.) and other indicators such as detecting gestures, the use of props, and movements of people (that are not usually associated with being a talking head type content) may also be relevant indicators. Attribute module 24 can also intelligently identify objects, backgrounds, and/or background noise. Attribute module 24 can identify scene changes; events recorded in the video file (e.g., person falling;

audience laughing; plane landing, etc.); audio changes (e.g., music starting; music changing; jingle; etc.) and other elements in the video content of each video file. For example, for scene detection activities, if there is a significant change between two video frames and, further, if this delta is consistent for multiple frames, such information can point toward a change in background or a visual change that signifies a video file needing visual attention.

In various embodiments, information from speaker recognition module 16, speech to text operations module 18, user rating mechanism module 20, and attribute module 22 may be used by tagging module 24 to tag video files with corresponding tags. For example, a video file with John speaking about a Widget Business Unit may include a section in which certain participants in the video are laughing, and the video may have a "must watch" rating from several users. Tagging module 24 may tag the video file with tags such as: <speaker> "John," <keyword> "Widget Business Unit," <attribute> "laugh," and <rating> "Must Watch." Note that these examples being provided herein are merely for illustrative purposes. Myriad other attributes and tags can be included in communication system 10 within the broad scope of the present disclosure. Each tag may be associated with the corresponding video clip; conversely, each video clip may include one or more tags.

Turning to frontend 36 (through which user 46 interacts with elements of communication system 10), user interface 38 may be implemented using any suitable means for interaction, such as a graphical user interface (GUI), a command line interface (CLI), web-based user interfaces (WUI), touchscreens, keystrokes, touch pads, gesture interfaces, display monitors, etc. User interface 38 may include hardware (e.g., monitor, display screen, keyboard, etc.) and software components (e.g., GUI, CLI, etc.). User interface 38 may provide a means for input (e.g., allowing user 46 to manipulate communication system 10) and output (e.g., allowing user 46 to view video report 34, among other uses).

According to embodiments of communication system 10, customization module 40 may allow users to input customization choices for creating video report 34. For example, customization module 40 may present certain predefined attributes to the user for selection (e.g., keywords, speaker, author, etc.) in a customization form to generate a search query. Customization module 40 may also include features allowing user 46 to enter a natural language query. Search engine 30 may search suitable video repositories for video clips matching the user's search query. Search results may be fed into analysis engine 32, which may aggregate the search results into video report 34 for consumption by user 46.

In various embodiments, user 46 may select embedded links provided by embedded link module 42 to view original video files and provide ratings for the video clip through feedback module 44 as desired. The user rating may be fed into user rating mechanism module 20 of collector 14, and aggregated with ratings for the video clip from other users. Share module 45 may allow user 46 to share video report 34 with others using various methods, for example, via email or a publish button that can send out video report 34 to various user groups.

In one embodiment, communication system 10 can generate a set of references to relevant video clips for constructing on-demand video report 34. In another embodiment, crowdsourcing feedback mechanism may be implemented in user rating mechanism module 20 to allow users to add/modify/rank content, for example as a "video wiki" where each page is an amalgamation of multiple videos. In various embodiments, multiple users can specify different criteria (e.g., search attributes) for the exact same videos and the video reports produced from these different criteria may be different from each other although the video sources (e.g., video files) are identical.

Turning to the infrastructure of FIG. 1, elements of communication system 10 may represent a series of points or nodes of interconnected communication paths for receiving and transmitting packets of information, which propagate through communication system 10. Elements of communication system 10 may include network elements (not shown) that offer a communicative interface between servers (and/or users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment.

As used herein in this Specification, the term "network element" is meant to encompass network appliances, servers, routers, switches, gateways, bridges, loadbalancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Elements of FIG. 1 may be coupled to one another through one or more interfaces employing any suitable connection (wired or wireless), which provides a viable pathway for electronic communications. Additionally, any one or more of these elements of FIG. 1 may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

In various embodiments, video source 12 may include any suitable repository for storing video files (e.g., web server, enterprise server, hard disk drives, camcorder storage devices, video cards, etc.). Video files may be stored in any file format (e.g., including Moving Pictures Experts Group (MPEG), Apple Quick Time Movie (MOV), Windows Media Video (WMV), Real Media (RM), etc.). Suitable file format conversion mechanisms, analog-to-digital conversions, etc. and other elements to facilitate accessing video files may also be implemented in video source 12 within the broad scope of the present disclosure.

In various embodiments, elements of communication system 10 may be implemented as a stand-alone solution with associated databases for video sources 12; processors and memory for executing instructions associated with the various elements (e.g., collector 14, connector 28, etc.), etc. User 46 may access the stand-alone solution to initiate activities associated therewith. In other embodiments, elements of communication system 10 may be dispersed across various networks. For example, video source 12 may be a web server located in an Internet cloud; collector 14 and connector 28 may be implemented on an enterprise server; and frontend 36 may be implemented on a user device (e.g., mobile devices, personal computers, electronic devices, and any other device, component, element, or object operable by a user and capable of initiating voice, audio, or video, exchanges within communication system 10). User 46 may run an application on the user device, which may bring up user interface 38, through which user 46 may initiate the activities associated with communication system 10. Myriad such implementation scenarios are possible within the broad scope of the present disclosure.

Embodiments of communication system 10 may leverage existing video repository systems (e.g., Cisco® Show and Share, YouTube, etc.), incorporate existing media/video tagging and speaker identification capability of existing devices (e.g., as provided in Cisco MXE3500 Media Experience Engine) and add features to allow users (e.g., user 46) to provide feedback for video clips by selecting (e.g., clicking) a suitable item (e.g., "Like" button), for example, while viewing the video file, or video report 34. The user feedback may be aggregated over substantially all users and across substantially all videos in communication system 10. Using backend capabilities provided in collector 14 (e.g., tagging videos for keywords, speakers and miscellaneous attributes like gestures, background, scenes, faces, etc.) communication system 10 may be opened up to users, who may benefit from the various attributes the system collects about the videos in turn to provide a broad choice of searching through the videos in video source 12.

Figure 2:
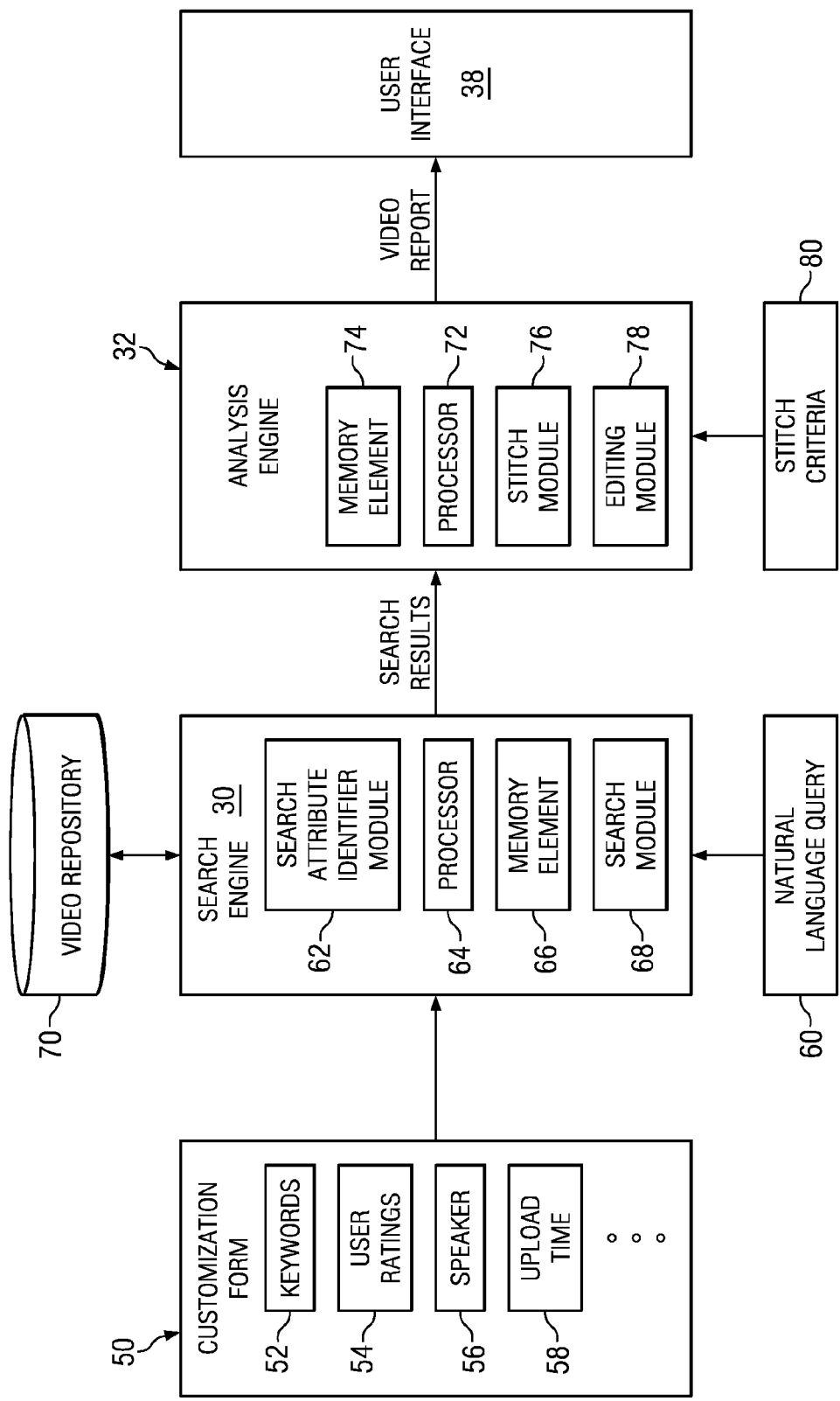
FIG. 2 is a simplified block diagram illustrating additional details of the communication system.

Turning to FIG. 2, FIG. 2 is a simplified block diagram of an example embodiment of communication system 10. A customization form 50 may include various attributes, such as keywords 52, user ratings 54, speaker 56, upload time 58, etc. Customization form 50 may allow user 46 to enter various attributes for populating a search query. For example, user 46 may enter the following search attributes into customization form 50: <Keywords> Flip Camera <User ratings> Yes <Speaker> John <Upload Time> From: January 2008 To: current; etc. for a search query for video clips tagged with keyword "Flip Camera" having "John" identified as a speaker, with user ratings, and uploaded from January 2008 to present. A natural language query 60 may be alternatively, or additionally, presented to user 46. For example, a natural language query such as "Search videos with user ratings for John speaking about Flip Camera and uploaded after December 2007" may lead to the same search results as in the previous example with customization form 50. In one embodiment, customization form 50, and natural language query 60 may be presented to user 46 via user interface 38.

Search engine 30 may include a search attribute identifier module 62, a processor 64, a memory element 66, and a search module 68. Search attribute identifier module 62 may parse the search query populated by customization form 50 and/or natural language query 60 to identify search attributes. For example, the search attributes identified from the previous example may include <Keywords> Flip Camera; <User ratings>Yes; <Speaker> John; <Upload Time>After December 2007; etc. Search module 68 may access video repository 70 to search for video clips having the search attributes. In various embodiments, video repository 70 may encompass a collection of video files. Video repository 70 may be implemented in a database, on a server, network device, hard disk, or any other storage medium that may be accessed by elements of communication system 10.

Search results may be provided to analysis engine 32, which may include a memory element 74, processor 72, stitch module 76, and editing module 78. The search results may include video clips from video files in video repository 70. In some embodiments, search engine 30 and analysis engine 32 may share processors (e.g., processor 64 and 72) and/or memory elements (e.g., memory element 66 and 74). Stitch criteria 80 may be provided for collating video clips. According to embodiments of communication system 10, stitch module 76 may arrange the video clips from the search results and stitch them together to generate video report 34. Editing module 78 may allow user 46 to further customize video report 34, for example, by re-arranging the video clips within video report 34, deleting one or more video clips from video report 34, adding text strings to video clips, etc.

In some embodiments, stitch module 76 may arrange the video clips from the search results according to stitch criteria 80. For example, stitch module 76 may arrange the search results in an order of highest rated first followed by the rest and present to user 46 as a single video report 34. In another example, stitch module 76 may arrange the search results in an order of time of events recorded in the respective video files. In one embodiment, stitch criteria 80 may be presented for selection by user 46 through customization form 50 (e.g., <Collate> "user rating"). In another embodiment, stitch criteria 80 may be presented to user 46 through natural language query 60 (e.g., "collate based on user rating"). In yet another embodiment, stitch criteria 80 may be set by an administrator. In yet another embodiment, user 46 may select stitch criteria 80 from a selection of attributes (e.g., an upload time attribute associated with when the video file was uploaded; a video creation time attribute associated with when the video file was created; a rating attribute associated with user ratings of the video file; a number of views attribute associated with a number of times the video file has been viewed; etc.) Video report 34 may be presented to user 46 via user interface 38.

Figure 3:
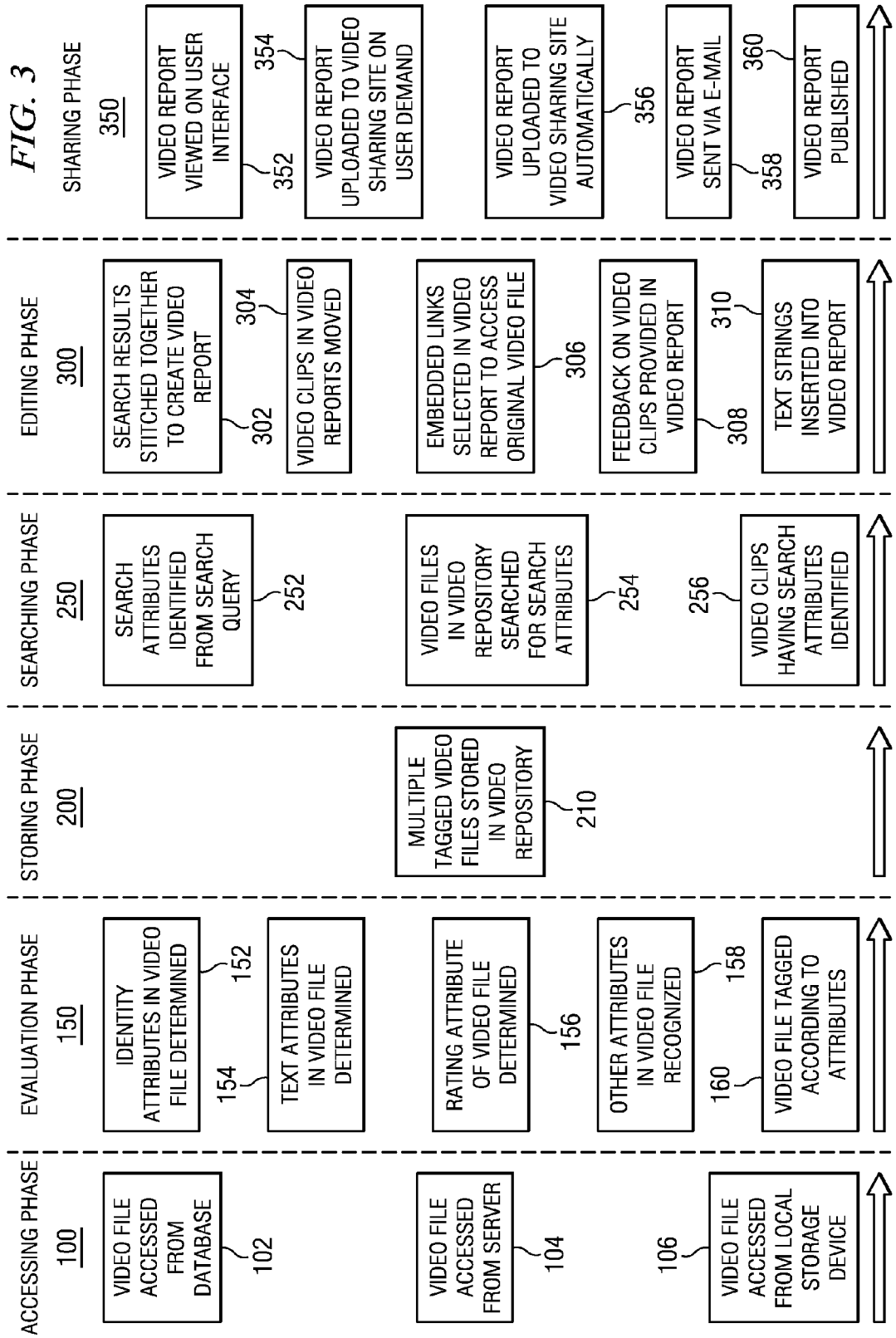
FIG. 3 is a simplified diagram illustrating example operational activities that may be associated with embodiments of the communication system.

Turning to FIG. 3, FIG. 3 is a simplified diagram of activities that may be associated with an embodiment of communication system 10. Various activities performed by elements of communication system 10 may be categorized into different phases: accessing phase 100, evaluation phase 150, storing phase 200, searching phase 250, editing phase 300, and sharing phase 350. At accessing phase 100, a video file may be suitably accessed. For example, in one embodiment, the video file may be accessed from a database at 102. In another embodiment, the video file may be accessed from a server (e.g., web server) at 104. In yet another embodiment, the video file may be accessed from a local storage device (e.g., video camera tape connected to user's computer).

At evaluation phase 150, the video file may be evaluated for predefined attributes. For example, identity attributes (e.g., speaker identity) in the video file may be determined at 152 (e.g., by speaker recognition module 16); text attributes (e.g., keywords) in the video file may be determined at 154 (e.g., by speech to text operations module 18); rating attribute (e.g., user rating) of the vide file may be determined at 156 (e.g., using user rating mechanism module 20). Other predefined attributes (e.g., scene changes, events, timestamps, etc.) may be recognized at 158 (e.g., by attribute module 22). At 160, the video file may be tagged according to the predefined attributes (e.g., by tagging module 24). At storing phase 200, the tagged video file may be stored in a video repository (e.g., video repository 70) with other similarly tagged video files.

At searching phase 250, the tagged video files in video repository 70 may be searched according to search queries generated by user 46. Search attributes may be identified from the user's search query at 252. In one embodiment, the search attributes may correspond to one or more existing tags of the video files. For example, the search attributes may match with some or all of the predefined attributes. In another embodiment, search attributes that do not match existing tags may be ignored during the search. In yet another embodiment, search attributes that do not match existing tags may be used to generate new tags (and/or predefined attributes), and the video files in video repository 70 may be re-evaluated for such attributes presented by the new tags. In such embodiments, as users use new attributes to search for video files, the number of predefined attributes (and tags) increases over time, and may lead to a richer storehouse of information and/or more complete searches.

At 254, the video files in video repository 70 may be searched for the search attributes. At 256, video clips having the search attributes may be identified. In one embodiment, if the search attributes are identical to some of the predefined attributes, the tags for each video file may be matched with the search attributes and if the tags match the search attributes, the video file may be divided into a plurality of video clips having the search attributes. In one example, if the tags match the corresponding search attributes, the video clip may be pulled into the search results. In some embodiments, less than all tags may be matched to the corresponding search attributes; in other embodiments, substantially all tags may be matched to the corresponding search attributes. Various methods of searching may be performed based on particular needs. For example, the searches may be optimized for fast searching. In another example, the searches may be optimized for accurate searching.

At editing phase 300, the search results (comprising the video clips having the search attributes) may be stitched into video report 34 and edited as desired. At 302, the identified video clips may be stitched together to create video report 34. In various embodiments, the video clips may be arranged according to stitch criteria 80 and stitched together by known methods. At 304, user 46 may move the video clips in video report 34 as desired. In some embodiments, user 46 may delete the video clip from video report 34. In some embodiments, user 46 may advance and/or move back one or more video clips relative to other video clips. At 306, user 46 may select embedded links in video report 34 to access the original video file associated with the corresponding video clip. At 308, user 46 may provide feedback on video clips in video report 34. For example, user 46 may select a "like" icon to indicate approval. At 310, user may input text strings into video report 34. Various other editing options may also be included to allow user 46 to manipulate and edit video report 34 as desired.

At sharing phase 350, user 46 may view or share video report 34. For example, at 352, user 46 may view video report 34 on user interface 38. At 354, user 46 may upload video report 34 to a video sharing site (e.g., You Tube). At 356, video report 34 may be automatically uploaded to the video sharing site upon user approval. At 358, user 46 may send video report 34 to others via e-mail. At 360, user 46 may publish video report 34, for example, on a public enterprise server accessible to others within the enterprise network.

In some embodiments, the phases may follow a chronological order. For example, accessing phase 100 may be followed in time by evaluation phase 150, then by storing phase 200, then by searching phase 250, then by editing phase 300, and finally by sharing phase 350. In other embodiments, the phases may not follow a chronological order. For example, evaluation phase 150 may be performed multiple times—first, before searching phase 250, and second, during searching phase 250; in embodiments where the search attributes generate new tags (for instance, stored video files may be evaluated further, during searching phase 250, for the new tags). In another example, editing phase 300 may be performed multiple times, including after sharing phase 350. For instance, user 46 may edit video report 34 a first time, and e-mail it to others for review; user 46 may then edit video report 34 further after receiving reviews from other users, and share it on a video sharing site. The order of the phases as presented in FIG. 3 is not intended to be a limitation; myriad variations in the order of the phases are possible within the broad scope of the present disclosure.

Figure 4:
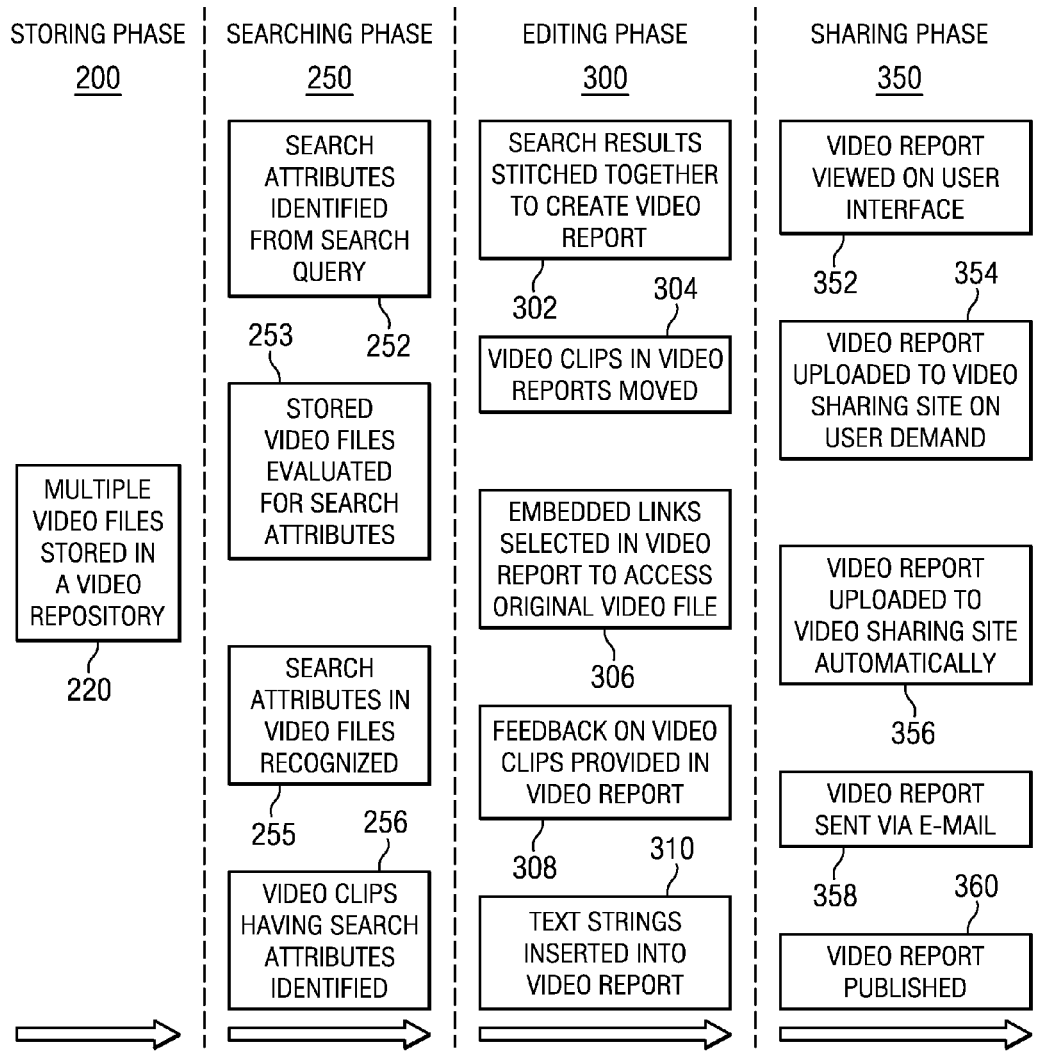
FIG. 4 is a simplified diagram illustrating example operational activities that may be associated with embodiments of the communication system.

Turning to FIG. 4, FIG. 4 is a simplified diagram of activities that may be associated with another embodiment of communication system 10. Various activities performed by elements of communication system 10 can be categorized into different phases. At storing phase 200, multiple video files may be stored in video repository 70. The video files may or may not be tagged for various attributes. At searching phase 250, searching and evaluation may be combined. For example, search attributes may be identified from the user's search query at 252. At 253, the stored video files may be evaluated for the search attributes. At 255, search attributes in the video files may be recognized. At 256, the video clips having the search attributes may be identified. In one embodiment, if a search attribute is recognized in a video file, the video file may be divided into a plurality of video clips such that at least one video clip has search attribute. In another embodiment, if substantially all search attributes are recognized in each video file, the video file may be divided into a plurality of video clips such that at least one video clip has substantially all search attributes.

Editing phase 300 and sharing phase 350 may be similar to the embodiment described in connection with FIG. 3. For example, at editing phase 300, the search results may be stitched into video report 34 and edited as desired. At 302, the identified video clips may be stitched together to create video report 34. At 304, user 46 may move the video clips in video report 34 as desired. At 306, user 46 may select embedded links in video report 34 to access the original video file associated with the corresponding video clip. At 308, user 46 may provide feedback on video clips in video report 34. At 310, user may input text strings into video report 34. Various other editing options may also be included to allow user 46 to manipulate and edit video report 34 as desired.

At sharing phase 350, user 46 may view or share video report 34. For example, at 352, user 46 may view video report 34 on user interface 38. At 354, user 46 may upload video report 34 to a video sharing site. At 356, video report 34 may be automatically uploaded to the video sharing site upon user approval. At 358, user 46 may send video report 34 to others via e-mail. At 360, user 46 may publish video report 34.

In some embodiments, the phases may follow a chronological order. For example, storing phase 200 may be followed by searching phase 250, then by editing phase 300, and finally by sharing phase 350. In other embodiments, the phases may not follow a chronological order. For example, editing phase 300 may be performed multiple times, including after sharing phase 350. For instance, user 46 may edit video report 34 a first time, and publish it on an internal enterprise server for review by others; user 46 may then edit video report 34 further after receiving reviews from others, and share it on a video sharing site as a final version. The order of the phases as presented in FIG. 4 is not intended to be a limitation; myriad variations in the order of the phases are possible within the broad scope of the present disclosure.

Figure 5:
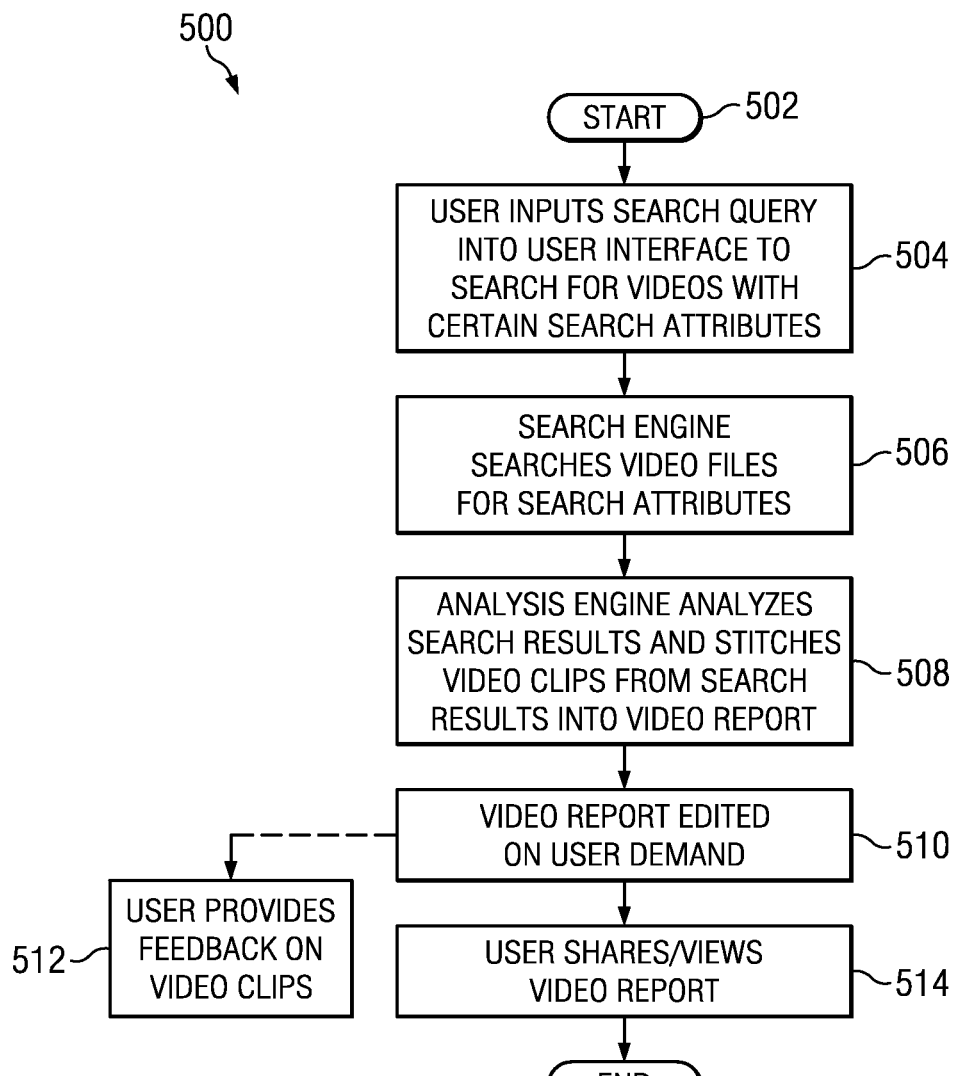
FIG. 5 is a simplified flow diagram illustrating example operational activities that may be associated with embodiments of the communication system in accordance with the present disclosure.

Turning to FIG. 5, FIG. 5 is a simplified flow diagram 500 illustrating operational steps that may be associated with embodiments of communication system 10. The operations may begin at 502 when communication system 10 is activated. For example, user 46 may open up user interface 38 for initiating activities associated with communication system 10. At 504, user 46 may input a suitable search query into user interface 38 to search for videos with certain search attributes. In one embodiment, the search query may be populated from customization form 50. In another embodiment, the search query may be natural language search query 60.

At 506, search engine 30 may search the video files in video repository 70 for the search attributes identified in the search query. At 508, analysis engine 32 may analyze the search results and stitch video clips from the search results into video report 34. At 510, video report 34 may be edited on user demand. For example, user 46 may delete some video clips, move video clips around, add text, etc. At 512, user 46 may optionally provide feedback on the video clips. At 514, user 46 may share or view video report 34. The operations end (or recycle) at 516.

In example embodiments, at least some portions of the activities outlined herein may be implemented in non-transitory logic (i.e., software) provisioned in, for example, nodes embodying various elements of communication system 10. This can include one or more instances of collector 14, connector 28, and/or frontend 36 being provisioned in various locations of the network. In some embodiments, one or more of these features may be implemented in hardware, provided external to these elements, or consolidated in any appropriate manner to achieve the intended functionality. Collector 14, connector 28, and/or frontend 36 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 10 described and shown herein may also include suitable interfaces for receiving, transmitting, and/or otherwise communicating data or information in a network environment. Additionally, some of the processors and memory associated with the various nodes may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 66, 74) can store data used for the operations described herein. This includes the memory element being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processors 64 and 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components in communication system 10 can include one or more memory elements (e.g., memory elements 66, 74, video repository 70) for storing information to be used in achieving operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more nodes. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of nodes. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a search query that includes one or more attributes;
    evaluating a plurality of video files, wherein when a specific search attribute is recognized in a particular video file, the particular video file may be divided into a plurality of video clips with at least one video clip having the recognized specific search attribute;
    identifying video clips within the video files that have one or more of the recognized specific search attributes; and
    creating a video report comprising a contiguous sequence of the identified video clips, wherein the video clips are stitched together according to a stitch criterion, wherein each video clip in the video report comprises an embedded link, which can be selected to access a corresponding video file that includes the particular video clip.

2. The method of claim 1, further comprising:
    providing a user interface configured for receiving feedback associated with the plurality of video files.

3. The method of claim 1, further comprising:
    tagging the video files with tags corresponding to predefined attributes; and
    identifying the predefined attributes in response to the search query.

4. The method of claim 3, further comprising:
    matching the tags with the one or more search attributes, wherein at least one video clip in a particular one of the video files has at least some of the one or more search attributes.

5. The method of claim 1, wherein the search query is a natural language query, or a customization form that includes predefined attributes.

6. The method of claim 5, wherein the predefined attributes are selected from a group of attributes, the group of attributes consisting of:
    a) an author attribute reflective of authorship of a particular video file;
    b) an identity attribute reflective of an identity of a speaker in a video content of the particular video file;
    c) a video playing source attribute;
    d) a number of views attribute associated with a number of times the particular video file has been viewed;
    e) a text attribute associated with spoken words recorded in the particular video file;
    f) a rating attribute associated with user ratings of the particular video file;
    g) an upload time attribute associated with when the particular video file was uploaded;
    h) a commentary attribute associated with comments in the particular video file;
    i) a location attribute associated with a location for the particular video file;
    j) an event attribute associated with an event recorded in the particular video file; and
    k) a scene change attribute associated with differences between video frames.

7. The method of claim 1, wherein the stitch criterion is selected from a group of stitch criteria, the group consisting of:
    a) an upload time attribute associated with when a particular video file was uploaded;
    b) a video creation time attribute associated with when the particular video file was created;
    c) an event time attribute associated with a time of an event recorded in the particular video file;
    d) a rating attribute associated with user ratings of the particular video file; and
    e) a number of views attribute associated with a number of times the particular video file has been viewed.

8. The method of claim 1, further comprising:
    providing the video report to a next destination, wherein the providing includes a selected one of a group of operations, the group consisting of:
    a) sending the video report via electronic mail;
    b) publishing the video report; and
    c) uploading the video report to a video sharing website.

9. The method of claim 1, further comprising:
    providing a user interface configured for editing the video report.

10. The method of claim 1, further comprising:
    crowd-sourcing feedback to allow adding, modifying, and ranking content in the video report.

11. Logic encoded in non-transitory media that includes code for execution and when executed by a processor is operable to perform operations, comprising:
    receiving a search query that includes one or more attributes;
    evaluating a plurality of video files, wherein when a specific search attribute is recognized in a particular video file, the particular video file may be divided into a plurality of video clips with at least one video clip having the recognized specific search attribute;
    identifying video clips within the video files that have one or more of the recognized specific search attributes; and
    creating a video report comprising a contiguous sequence of the identified video clips, wherein the video clips are stitched together according to a stitch criterion, wherein each video clip in the video report comprises an embedded links, which can be selected to access a corresponding video file that includes the particular video clip.

12. The logic of claim 11, the operations further comprising:
providing a user interface configured for receiving feedback associated with the plurality of video files.

13. The logic of claim 11, the operations further comprising:
tagging the video files with tags corresponding to predefined attributes; and
identifying the predefined attributes in response to the search query.

14. The logic of claim 13, the operations further comprising:
matching the tags with the one or more search attributes, wherein at least one video clip in a particular one of the video files has at least some of the one or more search attributes.

15. The logic of claim 11, wherein the search query is a natural language query, or a customization form that includes predefined attributes.

16. The logic of claim 11, wherein the operations further comprise:
crowd-sourcing feedback to allow adding, modifying, and ranking content in the video report.

17. An apparatus, comprising:
a memory element configured to store instructions; and
a processor coupled to the memory element, wherein the apparatus is configured for:
receiving a search query that includes one or more attributes;
evaluating a plurality of video files, wherein when a specific search attribute is recognized in a particular video file, the particular video file may be divided into a plurality of video clips with at least one video clip having the recognized specific search attribute;
identifying video clips within the video files that have one or more of the recognized specific search attributes; and
creating a video report comprising a contiguous sequence of the identified video clips, wherein the video clips are stitched together according to a stitch criterion, wherein each video clip in the video report comprises an embedded links, which can be selected to access a corresponding video file that includes the particular video clip.

18. The apparatus of claim 17, further comprising:
a user interface configured for receiving feedback associated with the plurality of video files.

19. The apparatus of claim 17, further comprising:
a tagging module configured for:
tagging the video files with tags corresponding to predefined attributes, wherein the predefined attributes can be identified in response to the search query.

20. The apparatus of claim 17, further comprising:
a crowd-sourcing feedback module to allow adding, modifying, and ranking content in the video report.

* * * * *